United States Patent [19]

Stern et al.

[11] 4,064,919
[45] Dec. 27, 1977

[54] METHOD OF FILLING DYNAMIC SCATTERING LIQUID CRYSTAL DEVICES

[75] Inventors: Herman Abraham Stern, Bridgewater; Howard Sorkin, Berkeley Heights; Henry Claude Schindler, East Brunswick, all of N.J.

[73] Assignee: RCA Corporation, New York, N.Y.

[21] Appl. No.: 744,128

[22] Filed: Nov. 22, 1976

[51] Int. Cl.² .............................................. B65B 31/00
[52] U.S. Cl. ................................. 141/7; 350/160 LC; 141/92
[58] Field of Search .................................. 141/1, 4–8, 141/11, 59, 61, 69, 70, 82, 92; 178/7.7; 350/160 LC; 427/230, 238

[56] References Cited

U.S. PATENT DOCUMENTS

| | | | |
|---|---|---|---|
| 3,698,449 | 10/1972 | Sorkin et al. | 141/1 |
| 3,938,242 | 2/1976 | Sussman | 350/160 LC |

Primary Examiner—Richard E. Aegerter
Assistant Examiner—Frederick R. Schmidt
Attorney, Agent, or Firm—H. Christoffersen; Birgit E. Morris

[57] ABSTRACT

A dynamic scattering liquid crystal cell can be filled from a single fill port by evacuating the cell, filling with a solution of an ionic dopant in a volatile solvent, evaporating the solvent and refilling under vacuum with the dynamic scattering liquid crystal composition. Ion hang-up is avoided and only a single volume of the liquid crystal composition is required to fill the cell.

3 Claims, 1 Drawing Figure

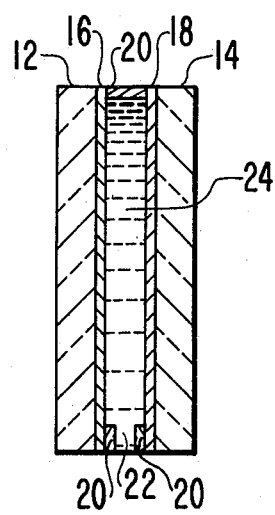

METHOD OF FILLING DYNAMIC SCATTERING LIQUID CRYSTAL DEVICES

This invention relates to dynamic scattering liquid crystal cells and to a method for filling them.

BACKGROUND OF THE INVENTION

A dynamic scattering liquid crystal cell comprises a thin layer of a dynamic scattering liquid crystal composition between two electrodes. Dynamic scattering liquid crystal compositions comprise a liquid crystal material having negative dielectric anisotropy containing both an ionic dopant to carry the charge through the cell and an aligning agent to insure uniform alignment of the liquid crystal molecules with respect to the electrodes. The aligning agent and the ionic dopant are generally added to the liquid crystal composition prior to filling the cell.

However, when the cell walls are made of inexpensive soda-lime glass coated with a transparent conductive layer, e.g. of tin oxide or indium oxide, the surface of the glass adsorbs the ionic dopant and the aligning agent at a faster rate than the liquid crystal material and thus the cell becomes nonuniform in composition throughout the cell.

It is known that in filling the cell through a single fill port, much of the ionic dopant and the aligning agent are adsorbed by the glass and consequently the liquid crystal material at the far end of the cell from the port contains little or none of these additives. Thus, when a voltage is applied to the cell, portions of the cell appear nonuniform, hazy, or even fail to dynamic scatter at all. The larger the liquid crystal cell, the more pronounced this effect becomes.

One method suggested in the past to overcome this problem is to allow two ports in the cell wall seal, and to flush the cell with a large amount of the desired liquid crystal composition so that the cell walls become saturated with the additive. Then, when a fresh batch of the liquid crystal composition is added to fill the cell, little or no additional stripping of the additives occurs and the liquid crystal composition remains uniform throughout the cell. This method has the disadvantage that a large quantity of liquid crystal composition is lost during the flushing, and two ports must be sealed in the cell walls.

In another method, a gaseous medium carrying the additive material is flushed through the cell prior to filling the cell with the liquid crystal composition. This method also precoats the cell walls, but again requires two fill ports. These methods are further described in U.S. Pat. No. 3,698,449.

Present commercial liquid crystal cells are sealed with a glass frit seal which has a single port for filling the cell. Sealing of this fill port to ensure an absolutely hermetic seal involves several steps of sputtering the walls of the fill port with metal layers and soldering over the hole. This is an expensive and essential step to preclude any liquid crystal material from leaking out of the cell, or, even more difficult, to preclude any air or moisture from entering the cell and degrading the liquid crystal material. Thus, to have to make two ports for filling dynamic scattering cells, rather than one, greatly adds to the expense of manufacture.

The cell walls cannot be coated with the dopant before the glass plates are sealed together, since they must be heated to about 500° C. to melt the glass frit seal joining the plates. The organic dopants would be destroyed during this sealing step.

Thus it would be desirable to be able to fill dynamic scattering liquid crystal cells using a single fill port but avoiding any inhomogeneities in the composition of the liquid crystal within the cell which would cause molecular misalignment or failure to dynamic scatter.

SUMMARY OF THE INVENTION

We have found that dynamic scattering liquid crystal cells can be filled from a single fill port by a vacuum fill, multi-step method whereby the cell is first vacuum filled with a solution containing the desired dopants, the solvent evaporated and the cell again vacuum filled, this time with the desired liquid crystal composition.

BRIEF DESCRIPTION OF THE DRAWING

The FIGURE is a sectional view of a liquid crystal cell having a single fill port to be filled by the process of the present invention.

DETAILED DESCRIPTION OF THE INVENTION

A typical liquid crystal cell is shown in the FIGURE and comprises two glass plates 12 and 14 each coated with a thin, transparent, conductive layer 16 and 18, respectively, as of tin oxide, which make up the electrodes. The electrodes can be patterned for digital or other display. A glass frit seal 20 extends around the periphery of the glass plates except for a single opening or port 22. A layer of liquid crystal material 24, typically about 0.5 micron thick, fills the space defined between the plates.

According to the present process, the unfilled liquid crystal cell as above is placed in a vacuum chamber and the pressure reduced to the vapor pressure of the solvent for the dopant. The fill port of the cell is lowered into a reservoir of a solution in a volatile solvent of a dopant for the liquid crystal composition. A suitable solution comprises hexadecylpyridinium tetraphenyl borate in ethanol or isopropanol at a concentration of about 0.3 gram per liter.

The cell, now filled with the dopant solution, is then placed in an oven at a temperature sufficiently high to evaporate the solvent, but not so high as to adversely affect the dopant. A temperature of about 85°–90° C. is generally suitable. When the solvent is evaporated, the cell is returned to the vacuum chamber, evacuated and immersed in the desired dynamic scattering liquid crystal composition. After the cell is filled, the fill port is closed in known manner. An effective sealing technique is disclosed in a copending application of Horsting et al., Ser. No. 638,849 filed Dec. 8, 1975.

Many ionic dopants for dynamic scattering liquid crystal compositions are known to those skilled in the art and the above example is merely illustrative. These dopants reduce the resistivity of liquid crystal compositions. Generally, the resistivity in dynamic scattering liquid crystal cells should be in a range of about $1 \times 10^8$ to about $5 \times 10^{10}$ ohm-cm. Various ionic dopants include, for example, ionizable organic salts such as bromides, borates, phosphates, quarternary ammonium halide salts, carboxylate or sulfamate salts, phosphonium salts and the like. Suitable compounds include, for example, hexadecylamino ammonium bromide, 1-hexadecyl pyridinium chloride, dodecylisoquinolinium bromide, dibenzyldimethyl ammonium chloride, 10-methylacridinium bromide and the like; organic carboxylate or sulfamate salts such as dioctadecyldimethyl-2-chloro-3,5-dinitrobenzene sulfamate and the like; quarternary ammonium salts of carboxylic acids such as the tetrabutyl ammonium salt of p-aminobenzoic acid, the ammonium hydroxide salts of carboxylic acids such as benzyltrimethylammonium hydroxide and the like; ammonium tetraborate compounds such as dioctadecyldimethyl ammonium tetraphenyl and the like; p-toluenesulfonic acid; phosphonium salts such as triphenylheptyl phosphonium bromide and the like; and pyridinium tetraphenyl borate salts such as hexadecylpyridinium tetraphenyl borate and the like. The ionic dopants must be soluble in the liquid crystal composition employed and must ionize in solution in the presence of an electric field.

Various homeotropic aligning agents are also well known to those skilled in the art and include for example esters such as alkoxyphenylalkanoates, alkoxybenzoates and the like; hydroxy-substituted esters such as p-hydroxybenzylidene-p'-aminophenyl acetate and the like; phenols such as p-methoxybenzylidene-p'-aminophenol and the like; long chain carboxylic acids such as p-octyloxybenzoic acid and the like; long chain alcohols such as dodecanol and the like; and long chain silanes such as dodecyltriethoxysilane and the like. The homeotropic aligning agents are generally added in amounts of from about 0.3 to about 2.0% by weight of the liquid crystal material.

The above process produces dynamic scattering liquid crystal cells of uniform appearance both in and out of operation. The predoping step saturates the surface of the glass plates with the dopants and prevents ion hang-up during the fill step. The liquid crystal composition remains uniform throughout the cell and is not depleted of dopants. The slight excess of dopant present in the cell can be compensated for if desired when making up the original liquid crystal composition.

The present process uses a minimum of excess dopant and liquid crystal material and requires only a single fill port. The present process deposits a very thin, uniform layer of the dopant in the cell which can be readily redissolved by the liquid crystal composition without unwanted visual interference due to local thick precipitation of the dopant.

The invention will be further described in the following example, but the invention is not meant to be limited to the details disclosed therein.

EXAMPLE

An ethanol solution containing 0.3 gram per liter of hexadecylpyridinium tetraphenyl borate was prepared and charged to a vacuum chamber. A liquid crystal cell as in the FIGURE, having a single fill port, was suspended in the chamber, fill port side down, above the solution. The chamber was evacuated and the fill port immersed in the solution to fill the cell. The cell was then dried in an oven at about 85°–90° C. until the solvent was evaporated, leaving a film of the dopant on the inside walls of the cell.

A stock liquid crystal mixture was prepared by admixing 165.4 grams of p-methoxybenzylidene-p'-n-butylaniline, 105 grams of p-ethoxybenzylidene-p'-aminophenylbutyrate and 105 grams of p-butoxybenzylidene-p'-aminophenylhexanoate. This mixture had a mesomorphic temperature range of from $-26°$ to $87°$ C.

A dopant solution was prepared by adding 100 milligrams of hexadecylpyridinium tetraphenyl borate to 20 grams of the above stock solution. The dopant solution was added dropwise to the remainder of the stock liquid crystal solution until the resistivity reached $2 \times 10^8$ ohm-cm. One percent by weight of p-methoxybenzylidene-p'-aminophenol was added as a homeotropic aligning agent.

The cell as prepared above was again suspended in the vacuum chamber, this time above a reservoir of the doped stock solution.

The chamber was evacuated and the cell fill port immersed in the liquid crystal solution to fill the cell.

A homogeneous cell was obtained.

What is claimed is:

1. A method of filling a dynamic scattering liquid crystal cell comprising a layer of a liquid crystal composition having negative dielectric anisotropy containing an ionic dopant between two electrodes, said cell having a single fill port, which comprises the steps of:
    evacuating said cell,
    immersing said cell in a solution of an ionic dopant in a volatile solvent to fill the cell with said solution,
    evaporating the volatile solvent leaving a film of said dopant on the inside walls of the cell,
    evacuating said cell, and
    immersing said cell in a dynamic scattering liquid crystal composition containing an ionic dopant to fill the cell.

2. A method according to claim 1 wherein the doped liquid crystal composition has a resistivity of from about $1 \times 10^8$ to about $5 \times 10^{10}$ ohm-cm.

3. A method according to claim 1 wherein the liquid crystal composition additionally contains an effective amount of a homeotropic aligning agent.

* * * * *